US012300101B2

(12) United States Patent
Jung et al.

(10) Patent No.: US 12,300,101 B2
(45) Date of Patent: May 13, 2025

(54) APPARATUS AND SYSTEM FOR DETECTING ROAD SURFACE CONDITION AND METHOD FOR DETECTING ROAD SURFACE CONDITION BY USING SAME

(71) Applicant: SK Planet Co., Ltd., Seongnam-si (KR)

(72) Inventors: Jong Hee Jung, Yongin-si (KR); Yeonghyeon Park, Suwon-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 206 days.

(21) Appl. No.: 17/920,728

(22) PCT Filed: May 13, 2021

(86) PCT No.: PCT/KR2021/005994

§ 371 (c)(1),
(2) Date: Oct. 21, 2022

(87) PCT Pub. No.: WO2021/230670

PCT Pub. Date: Nov. 18, 2021

(65) Prior Publication Data

US 2023/0169856 A1 Jun. 1, 2023

(30) Foreign Application Priority Data

May 13, 2020 (KR) ........................ 10-2020-0057140

(51) Int. Cl.
*G08G 1/09* (2006.01)
*E01H 10/00* (2006.01)
(Continued)

(52) U.S. Cl.
CPC ............. *G08G 1/093* (2013.01); *G08G 1/048* (2013.01); *G08G 1/052* (2013.01); *E01H 10/005* (2013.01)

(58) Field of Classification Search
CPC ...................................................... G08G 1/093
See application file for complete search history.

(56) References Cited

U.S. PATENT DOCUMENTS 5,347,456 A * 9/1994 Zhang .................. G05D 1/0261 701/23
5,852,243 A 12/1998 Chang et al.
(Continued)

FOREIGN PATENT DOCUMENTS

JP H 11-126295 A 5/1999
JP 2002-256521 A 9/2002
(Continued)

OTHER PUBLICATIONS

Extended European Search Report of EP 21803739 Mailed on Sep. 14, 2023.
(Continued)

*Primary Examiner* — Jean Paul Cass
(74) *Attorney, Agent, or Firm* — WTA Patents

(57) ABSTRACT

The present invention relates to: an apparatus and system for detecting a road surface condition, wherein the road surface condition is determined through a sound signal; and a method for detecting a road surface condition by using same. The apparatus for detecting a road surface condition according to the present invention comprises: a sensor unit which is installed on a road and measures a sound signal generated according to a moving of a moving object on the road; and a control unit which distinguishes the sound signal measured by the sensor unit into normality or abnormality and determines, in case of the abnormality, the road surface condition including at least one of rainfall (wet), frozenness (icy), slush, and snow cover (snowy) so that a quick and accurate action corresponding to the road surface condition of a specific section can be made from a distanced place.

14 Claims, 6 Drawing Sheets

(51) Int. Cl.

| | |
|---|---|
| ***G08G 1/048*** | (2006.01) |
| ***G08G 1/052*** | (2006.01) |

(56) References Cited

U.S. PATENT DOCUMENTS

| | | | | |
|---|---|---|---|---|
| 2006/0047469 A1* | 3/2006 | Fabre | B60C 23/0408 | 702/138 |
| 2009/0256723 A1* | 10/2009 | Peddie | G08G 1/096783 | 340/907 |
| 2011/0200199 A1* | 8/2011 | Wakao | G01H 17/00 | 381/56 |
| 2016/0221581 A1* | 8/2016 | Talwar | G01N 29/14 | |
| 2020/0342760 A1* | 10/2020 | Vassilovski | G05D 1/0088 | |

FOREIGN PATENT DOCUMENTS

| | | | | | |
|---|---|---|---|---|---|
| JP | 2002-269683 A | | 9/2002 | | |
| JP | 2006-351000 A | | 12/2006 | | |
| JP | 2008017483 A | * | 1/2008 | | G08G 1/093 |
| JP | 2008-143508 A | | 6/2008 | | |
| JP | 5436442 B2 | * | 3/2014 | | B60T 8/172 |
| KR | 10-2000-0018253 A | | 4/2000 | | |
| KR | 20040070259 A | * | 8/2004 | | |
| KR | 10-2006-0021496 A | | 3/2006 | | |
| KR | 10-1731050 B | | 4/2017 | | |
| KR | 10-1857663 B1 | | 5/2018 | | |
| KR | 10-1967585 B1 | | 4/2019 | | |
| KR | 2019107394 A | * | 9/2019 | | B32B 27/08 |
| KR | 10-2019-0140272 A | | 12/2019 | | |
| KR | 20190140272 A | * | 12/2019 | | |
| KR | 102609459 B1 | * | 12/2023 | | |

OTHER PUBLICATIONS

PCT International Search Report and Written Opinion, PCT Application No.

PCT/KR2021/005994, Aug. 30, 2021, 10 pages (with English translation of PCT International Search Report).

Korean Office Action, Korean Application No. 10-2020-0057140, Aug. 19, 2021, 7 pages (with concise explanation of relevance).

Office action of the corresponding Japanese Patent Application No. 2022-566408 mailed on Apr. 2, 2025.

* cited by examiner

APPARATUS AND SYSTEM FOR DETECTING ROAD SURFACE CONDITION AND METHOD FOR DETECTING ROAD SURFACE CONDITION BY USING SAME

TECHNICAL FIELD

The present invention relates to a road surface condition detection apparatus, and more particularly, to a road surface condition detection apparatus and system for determining a road surface condition through a sound signal, and a road surface condition detection method using the same.

BACKGROUND ART

Black ice refers to a thin layer of snow or rain that seeps into the cracks of the asphalt road during the day, mixes with road oil and dust, and freezes thinly on the road at night.

Black ice is often seen as a major cause of traffic accidents, as it is less conspicuous when driving on the road and is easy to just assume that the road is a little wet.

In recent years, various studies have been conducted to detect black ice in advance and warn the driver or perform snow removal operations.

Korean Patent Publication No. 10-2019-0140272 discloses an "apparatus and method for sensing black ice".

The disclosed black ice sensing apparatus is equipped in a vehicle to sense black ice. This apparatus includes a sensing unit for measuring a road surface temperature and an ambient temperature, a control unit for determining the existence of black ice by using the road surface temperature and the ambient temperature, and a communication unit for transmits black ice information to a navigation device when the control unit determines that there is black ice.

In case of measuring a temperature by transmitting a laser or ultrasonic wave and then receiving a waveform as in the disclosed black ice sensing apparatus, black ice can be detected. However, because a sensing range is only a few meters in front of a driving vehicle, there is a problem in that the time for a driver to actually respond to a danger is short.

In addition, various studies have been conducted, such as judging black ice based on the anti-lock brake system (ABS) operation, that is, a vehicle's wheel rotation speed difference, but the above-mentioned problem still could not be solved.

DISCLOSURE

Technical Problem

Accordingly, the present invention is intended to provide an apparatus and system for detecting a road surface condition and a method for detecting a road surface condition using the same, which can determine the road surface condition of a specific section from a remote location and thereby quickly and accurately take measures corresponding to the road surface condition.

Technical Solution

According to the present invention, an apparatus for detecting a road surface condition may include a sensor unit installed on a road and measuring a sound signal generated according to a movement of a moving object on the road; and a controller distinguishing the sound signal measured by the sensor unit as a normal state or an abnormal state and determining, in case of the abnormal state, the road surface condition including at least one of wet, icy, slush, and snowy conditions.

In the apparatus according to the present invention, the controller may learn road surface conditions depending on sound signals measured by the sensor unit and determine the road surface condition through stored learning data.

In the apparatus according to the present invention, the controller may filter a background value and noise from the sound signal measured by the sensor unit and determine the road surface condition based on a frequency range configured for each road surface condition.

In the apparatus according to the present invention, the controller may determine the road surface condition in real time based on each moving object and finally determine the corresponding road surface condition when the road surface conditions for a predetermined number of moving objects match.

In the apparatus according to the present invention, the sensor unit may measure a road surface temperature, ambient temperature, and humidity.

In the apparatus according to the present invention, the controller may determine the road surface condition through the sound signal, calculate a dew point through the surface temperature and humidity measured by the sensor unit, and apply the calculated dew point and the ambient temperature to determining the road surface condition.

In the apparatus according to the present invention, the controller may determine that the road surface is icy when the calculated dew point exceeds a predetermined value and when the ambient temperature is lower than a predetermined value.

In the apparatus according to the present invention, the controller may determine a pot hole, a crash, or a skid through the sound signal measured by the sensor unit.

According to the present invention, a system for detecting a road surface condition may include a road surface condition detection apparatus installed on a road and measuring a sound signal generated according to a movement of a moving object on the road; and a management server receiving the sound signal from the road surface condition detection apparatus, distinguishing the sound signal as a normal state or an abnormal state, and determining, in case of the abnormal state, the road surface condition including at least one of wet, icy, slush, and snowy conditions.

In the system according to the present invention, the road surface condition detection apparatus may be provided as a plurality of road surface condition detection apparatuses installed to be spaced apart from each other at regular intervals on the road.

In the system according to the present invention, the management server may calculate a speed of the moving object based on a predetermined distance between the road surface condition detection apparatuses and by measuring a passing time of the moving object from the sound signal measured by the road surface condition detection apparatus.

In the system according to the present invention, the management server may determine a range of the road surface condition, based on whether road surface conditions determined from adjacent road surface condition detection apparatuses overlap with each other.

In the system according to the present invention, the management server may output the determined road surface condition through an electronic road sign (VMS, variable message signs) or operate a snow removal device installed at a corresponding location relying on the determined road surface condition.

According to the present invention, a method for detecting a road surface condition may include, by a road surface condition detection apparatus installed on a road, measuring a sound signal generated according to a movement of a moving object on the road; by the road surface condition detection apparatus, distinguishing the measured sound signal as a normal state or an abnormal state; and by the road surface condition detection apparatus, determining, in case of the abnormal state, the road surface condition including at least one of wet, icy, slush, and snowy conditions.

According to the present invention, a method for detecting a road surface condition may include, by a management server, receiving, from a road surface condition detection apparatus installed on a road, a sound signal generated according to a movement of a moving object on the road; by the management server, distinguishing the sound signal as a normal state or an abnormal state; and by the management server, determining, in case of the abnormal state, the road surface condition including at least one of wet, icy, slush, and snowy conditions.

Advantageous Effects

The road surface condition detection apparatus according to the present invention can determine a road surface condition including at least one of wet, icy, slush, and snowy conditions through a sound signal, thereby quickly and accurately taking measures corresponding to the road surface condition of a specific section from a remote location without a shaded area due to its wide coverage.

MODE FOR INVENTION

Figure 1:
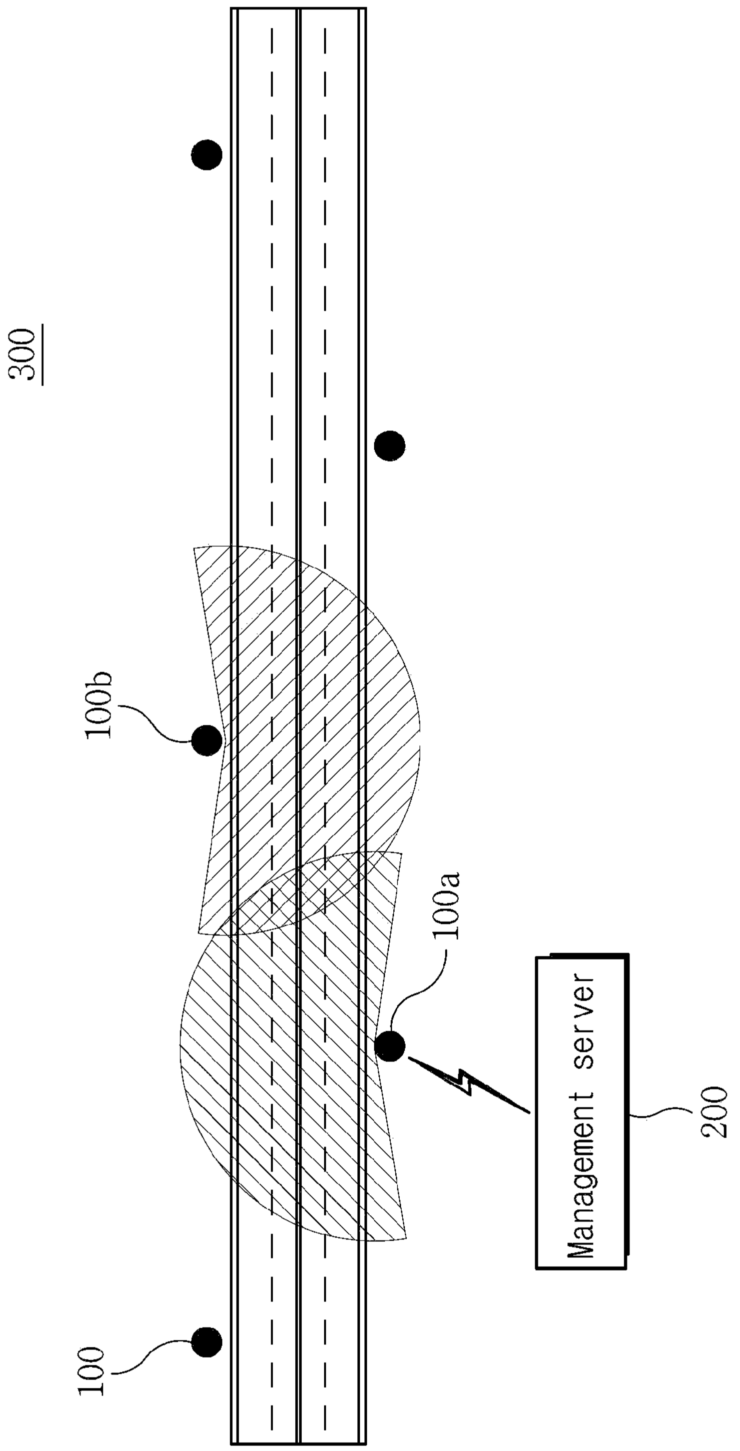
FIG. 1 is a diagram illustrating a road surface condition detection system according to an embodiment of the present invention.

Now, embodiments of the present invention will be described in detail with reference to the accompanying drawings. However, in the following description and the accompanying drawings, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings thereof and are merely used by the inventor to enable a clear and consistent understanding of the invention. Thus, it will be apparent to those skilled in the art that the following description about various embodiments of the present invention is provided for illustration purpose only and not for the purpose of limiting the invention as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present invention. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Hereinafter, embodiments of the present invention will be described in detail with reference to the accompanying drawings.

FIG. 1 is a diagram illustrating a road surface condition detection system according to an embodiment of the present invention.

Referring to FIG. 1, the road surface condition detection system 300 according to an embodiment of the present invention includes a road surface condition detection apparatus 100 and a management server 200.

The road surface condition detection apparatus 100 may be disposed to be spaced apart from each other at regular intervals on the road. The road surface condition detection apparatus 100 may be arranged in a zigzag manner at both sides of the road or arranged in a line at one side. For example, the road surface condition detection apparatus 100 may be installed at intervals of 100 meters in a section vulnerable to freezing or at intervals of 80 meters in a section vulnerable to freezing near a steep slope or a sharp curve.

In addition, the road surface condition detection apparatus 100 measures a sound signal generated according to the movement of a moving object on the road in real time. The moving object may be representatively, but is not limited to, a vehicle. There may be various moving objects, such as a motorcycle, that generate noise while moving on a road surface.

In addition, the road surface condition detection apparatus 100 distinguishes the measured sound signal as a normal state or an abnormal state and determines, in case of the abnormal state, a road surface condition including wet, icy, slush, and snowy conditions. The road surface in the normal state is in a dry condition. Further, the road surface condition detection apparatus 100 may determine a pot hole, a crash, or a skid through a sound signal. In particular, the road surface condition detection apparatus 100 according to the present invention learns road surface conditions depending on measured sound signals and determines a road surface condition through stored learning data.

As such, the road surface condition detection apparatus 100 itself may measure a sound signal and determine a road surface condition based on the measured sound signal. In a case where the road surface condition detection apparatus

100 determines a road surface condition by itself, the configuration of the apparatus becomes complicated and each road surface condition detection apparatus 100 has to store a large amount of data. Thus, it may be desirable that the road surface condition detection apparatus 100 collects sound signals according to the movement of a moving object and transmits the collected sound signals to the management server 200 in real time.

The management server 200 has an ID of each road surface condition detection apparatus 100 and also has a reference value for each road surface condition detection apparatus 100, that is, a frequency spectrum of a sound when driving on a dry road.

Therefore, upon receiving a sound signal from the road surface condition detection apparatus 100, the management server 200 may distinguish the sound signal as a normal state or an abnormal state. That is, the management server 200 may primarily determine whether the road surface is in a normal state or an abnormal state.

In addition, when the road surface condition is abnormal, the management server 200 determines the road surface condition including at least one of wet, icy, slush, and snowy conditions. In particular, the management server 200 according to an embodiment of the present invention learns road surface conditions depending on measured sound signals and determines a road surface condition through stored learning data.

The management server 200 may output the determined road surface condition through an electronic road sign (VMS, variable message signs) or operate a snow removal device installed at a corresponding location relying on the determined road surface condition. For example, the management server 200 may operate in conjunction with a control system for managing and monitoring a road state or be installed in the control system, and may automatically expose an abnormal road condition and location on a screen. Thus, the control system may output a warning message through the electronic road sign, spray salt water or calcium chloride through a snow removal device installed on the road, or dispatches a tow vehicle in case of an accident.

In addition, the management server 200 may calculate a speed of a moving object based on a predetermined distance between the road surface condition detection apparatuses 100 and by measuring a passing time of the moving object from the sound signal measured by the road surface condition detection apparatus 100. That is, the management server 200 may determine a peak value of the sound signal measured by each road condition detection apparatus 100 as the passing time of the moving object and calculate the speed of the moving object by measuring the passing times of the road surface condition detection apparatuses 100. The measured speed may be used to crack down on the over-speed of a moving object in conjunction with a camera installed on the road. In this way, it is possible to reduce the cost of over-speed measuring equipment buried in the road. Meanwhile, although it has been described that the management server 200 performs the function of measuring the speed of the moving object, this is not a limitation. Alternatively, the road surface condition detection apparatus 100 by itself may measure the speed of the moving object through mutual communication and operate in conjunction with the camera.

Also, the management server 200 may determine the range of a road surface condition, based on whether road surface conditions determined from adjacent road surface condition detection apparatuses 100 overlap with each other. For example, when it is determined that the road surface conditions corresponding to a first road surface condition detection apparatus **100*a* and a second road surface condition detection apparatus 100*b* are icy, the management server 200 may determine a section between the first and second road surface condition detection apparatuses 100*a* and 100*b*** as an icy section.

As such, the road surface condition detection system 300 according to an embodiment of the present invention can determine a road surface condition including at least one of wet, icy, slush, and snowy conditions through a sound signal, thereby quickly and accurately taking measures corresponding to the road surface condition of a specific section from a remote location without a shaded area due to its wide coverage.

Hereinafter, the road surface condition detection apparatus 100 according to an embodiment of the present invention will be described in more detail.

Figure 2:
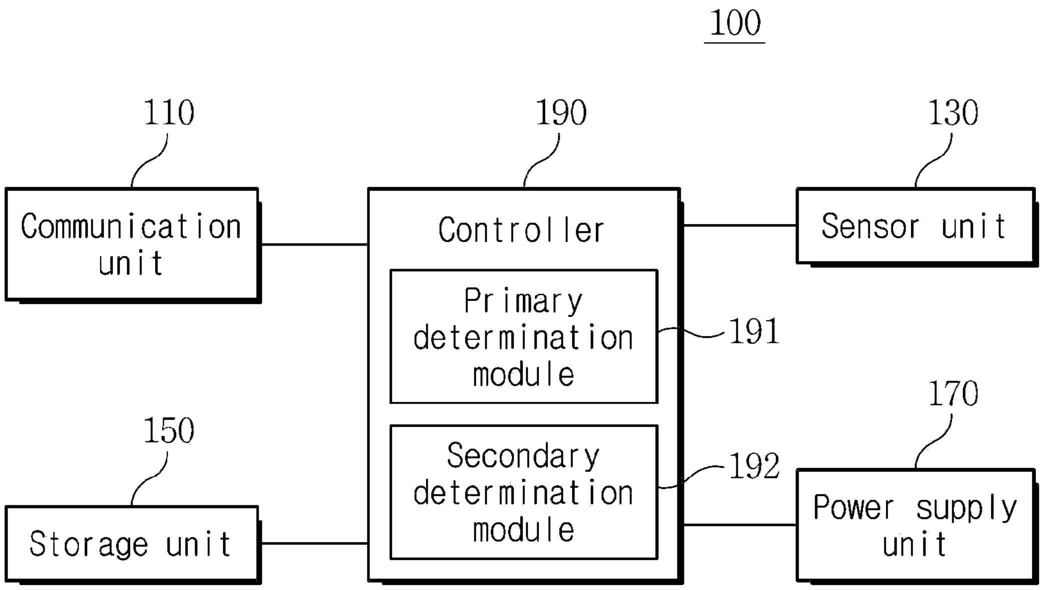
FIG. 2 is a block diagram illustrating the configuration of a road surface condition detection apparatus according to an embodiment of the present invention.

FIG. 2 is a block diagram illustrating the configuration of a road surface condition detection apparatus according to an embodiment of the present invention.

Referring to FIG. 2, the road surface condition detection apparatus 100 according to an embodiment of the present invention is configured to include a communication unit 110, a sensor unit 130, a storage unit 150, a power supply unit 170, and a controller 190.

The communication unit 110 transmits and receives data with the management server 200 or between respective components in the road surface condition detection apparatus 100. In particular, the communication unit 110 may transmit a sound signal measured by the sensor unit 130 to the controller 170 or the management server 200 and, in case where the road surface condition detection apparatus 100 itself analyzes the sound signal, transmit an analysis result (i.e., information on a current road surface condition) to the management server 200. The communication unit 110 may receive the sound signal from the sensor unit 130 or transmit the sound signal to the management server 200 through long range (LoRa) communication, long term evolution (LTE) communication, 5G communication, or the like. The communication unit 110 may include a modem that modulates a signal to be transmitted and demodulates a received signal.

The sensor unit 130 may measure a sound signal as a moving object moves on a road.

The sensor unit 130 may be a non-directional high-sensitivity microphone for measuring a sound signal. In addition, the sensor unit 130 may include a temperature sensor for measuring an ambient temperature, a humidity sensor for measuring an ambient humidity, and an infrared (IR) surface temperature sensor for measuring a road surface temperature. The sensor unit 130 may transmit the measured sound signal, ambient temperature, ambient humidity, and road surface temperature to the controller 170 in real time. The sensor unit 130 may be installed separately from the controller 170 or formed integrally with the controller 170. That is, the controller 170 may be configured to cover a plurality of sensor units 130 through the communication unit 110, and one controller 170 may be configured to collect sound signals, ambient temperatures, ambient humidity, and road surface temperatures from the plurality of sensor units 130. In addition, one sensor unit 130 may be integrally formed with one controller 170.

The storage unit 150 stores a program and data necessary for the functional operation of the road surface condition detection apparatus 100. In particular, the storage unit 150 may store an algorithm for distinguishing a sound signal measured by the sensor unit 130 as a normal state or an abnormal state. For example, the algorithm for distinguishing a sound signal as a normal or abnormal state may be a generative model. In addition, the storage unit 150 may store an algorithm for determining a road surface condition including wet, icy, slush, and snowy conditions in case of an abnormal state. For example, the algorithm for determining the road surface condition may be a discriminative model.

The power supply unit 170 supplies power according to the functional operation of the road surface condition detection apparatus 100. The power supply unit 170 may be configured to receive commercial power, or to generate power by itself by having a solar panel and a battery.

The controller 190 controls the overall functional operation of the road surface condition detection apparatus 100. The controller 190 may include a primary determination module 191 and a secondary determination module 192.

The primary determination module 191 distinguishes a sound signal measured by the sensor unit 130 as a normal state or an abnormal state. The controller 190 may determine a normal or abnormal state through the generative model stored in the storage unit 150 and learn the result.

Figure 6:
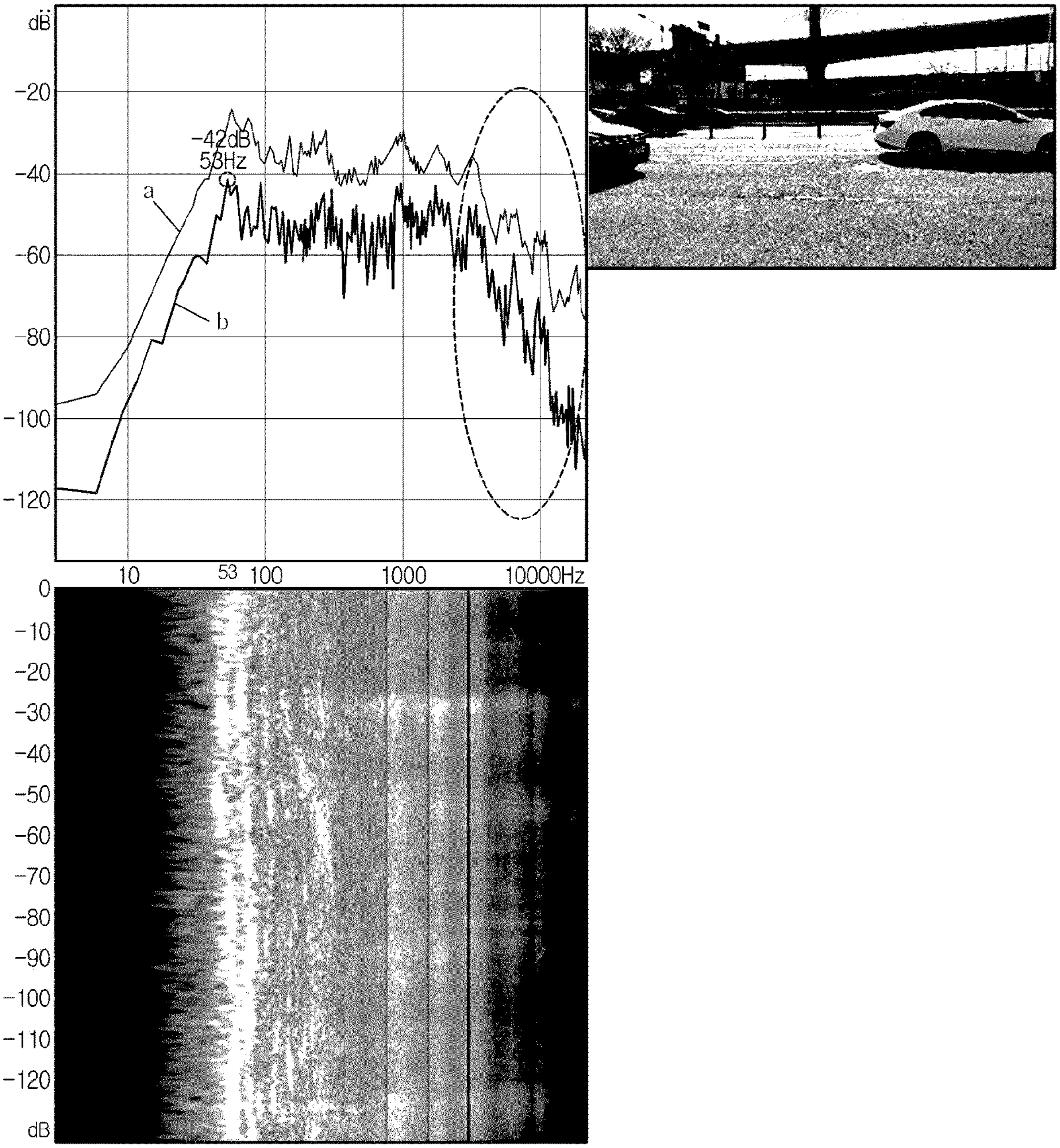
FIGS. 6 and 7 are graphs illustrating frequency characteristics of sound signals depending on road surface conditions.
Figure 7:
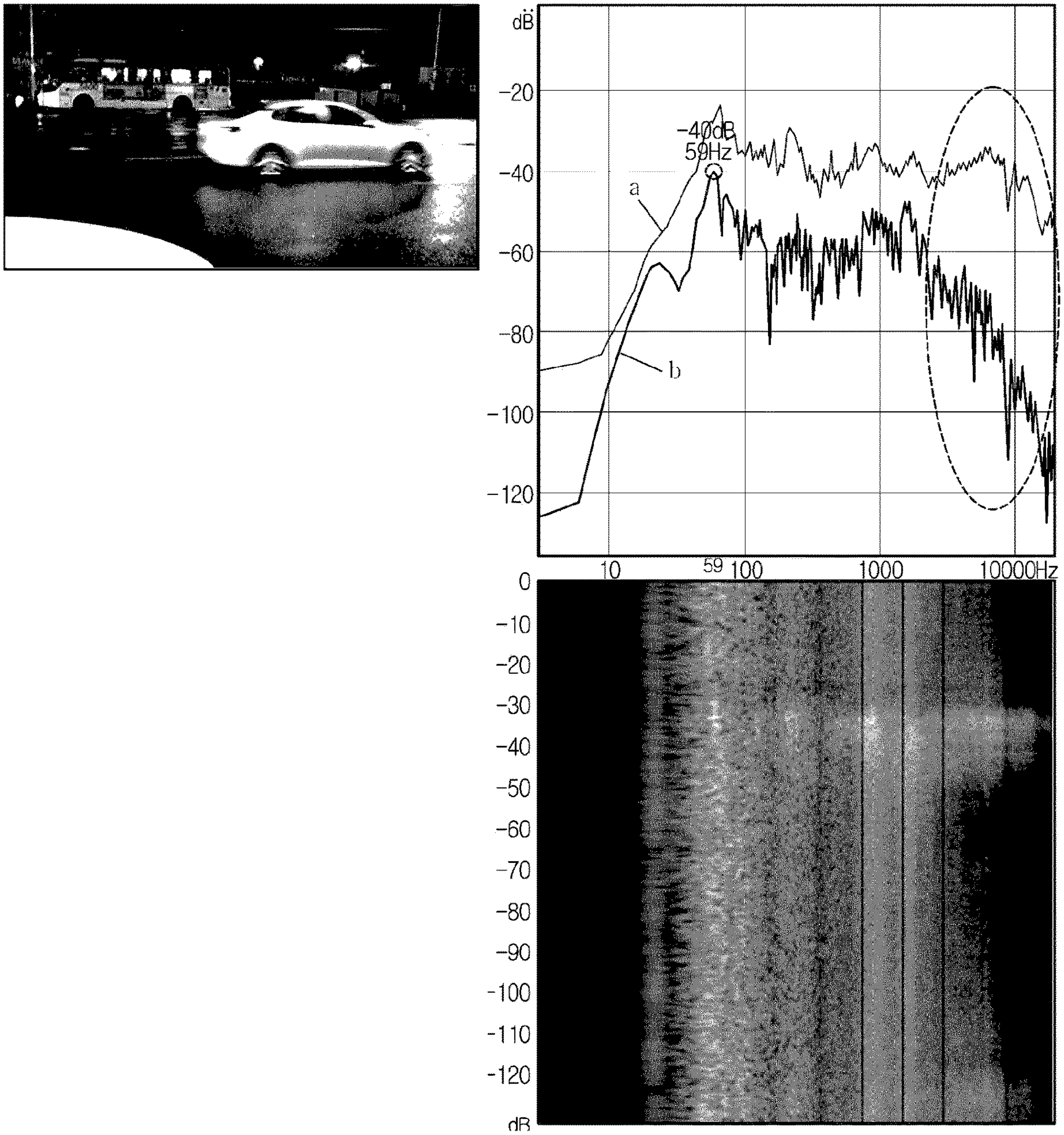

Meanwhile, FIGS. 6 and 7 are graphs illustrating frequency characteristics of sound signals depending on road surface conditions. Here, FIG. 6 is a graph showing the frequency characteristics according to the movement of a vehicle on a clear day, and FIG. 7 is a graph showing the frequency characteristics according to the movement of the same vehicle at the same location as FIG. 6 on a rainy day. The graph of FIG. 6 shows a small difference between the value (a) when there is no vehicle and the value (b) when a vehicle is moving, whereas the graph of FIG. 7 shows a significant difference between the value (a) when there is no vehicle and the value (b) when a vehicle is moving, compared to the graph of FIG. 6. As described above, the primary determination module 191 may determine a normal state or an abnormal state through a difference in frequency between the normal state and the abnormal state.

The secondary determination module 192 determines a road surface condition including at least one of wet, icy, slush, and snowy conditions in case of the abnormal state. Here, the secondary determination module 192 may filter a background value and noise from the sound signal measured by the sensor unit 130, and then determine the road surface condition based on a frequency range configured for each road surface condition. In this case, the secondary determination module 192 may determine the road surface condition through the discriminative model and learn the determination result.

In order to increase the accuracy of the determination result of the road surface condition, the secondary determination module 192 may determine the road surface condition in real time based on each moving object and finally determine the corresponding road surface condition when the road surface conditions for a predetermined number of moving objects match. That is, instead of transmitting the determination result for one moving object to the management server 200 in real time, the secondary determination module 192 may accumulates the determination results for a predetermined number of moving objects and, when the accumulated determination results match, notify the corresponding road surface condition to the management server 200, thereby increasing accuracy.

In addition, the secondary determination module 192 may not only determine the road surface condition through the sound signal, but also calculate the dew point through the surface temperature and humidity measured by the sensor unit 130 and apply the calculated dew point and the ambient temperature to determining the road surface condition. For example, the secondary determination module 192 may determine that the road surface is wet when the calculated dew point exceeds a predetermined value, and determine that the road surface is icy when the ambient temperature is lower than a predetermined value while the road surface is wet.

Also, the secondary determination module 192 may determine a pot hole, a crash, or a skid through the sound signal measured by the sensor unit 130.

In addition, the secondary determination module 192 may calculate the speed of a moving object by measuring a distance to and a passing time at a predetermined road surface condition detection apparatus 100. That is, the secondary determination module 192 may receive, from the predetermined road surface condition detection apparatus 100 through the communication unit 110, a time when the moving object passes the predetermined road surface condition detection apparatus 100. In this case, the predetermined road surface condition detection apparatus may be a road surface condition detection apparatus disposed at a previous position in the moving direction of the moving object. The secondary determination module 192 may calculate a time required for passing the current road surface condition detection apparatus from the predetermined road surface condition detection apparatus, based on a time received from the predetermined road condition detection apparatus and a time at which the moving object currently passes. Also, the secondary determination module 192 may calculate the speed of the moving object, based on the calculated time and a distance to the predetermined road surface condition detection apparatus stored in the storage unit 150. When the calculated speed exceeds a predetermined speed, the secondary determination module 192 may transmit this information to a neighboring camera to photograph the moving object. That is, the secondary determination module 192 may be used to crack down on the over-speed of a moving object in conjunction with a camera installed on the road. In this way, it is possible to reduce the cost of over-speed measuring equipment buried in the road.

Hereinafter, the configuration of the management server 200 according to an embodiment of the present invention will be described in more detail.

Figure 3:
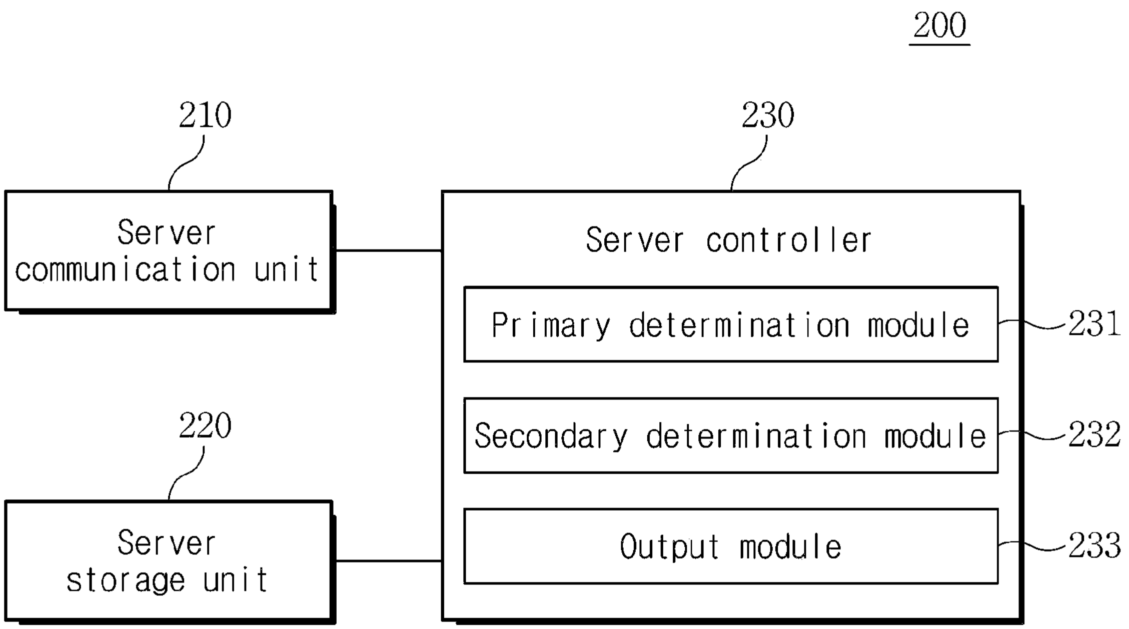
FIG. 3 is a block diagram illustrating the configuration of a management server according to an embodiment of the present invention.

FIG. 3 is a block diagram illustrating the configuration of a management server according to an embodiment of the present invention.

Referring to FIG. 3, the management server 200 may be configured to include a server communication unit 210, a server storage unit 220, and a server controller 230.

The server communication unit 210 may perform data transmission/reception with the road surface condition detection apparatus 100. In particular, the server communication unit 210 may receive a sound signal from the road surface condition detection apparatus 100 or, when the road surface condition detection apparatus 100 itself performs a sound signal analysis, receive an analysis result, that is, information on a current road surface condition. The server communication unit 210 may receive the sound signal or the analysis result from the road surface condition detection apparatus 100 through long term evolution (LTE) communication, 5G communication, or the like. In addition, the server communication unit 210 may transmit and receive data by communicating with a control system that manages and monitors a road state.

The server storage unit 220 stores a program and data necessary for the functional operation of the management server 200. In particular, the server storage unit 220 may store an algorithm for distinguishing a sound signal measured by the road surface condition detection apparatus 100 as a normal state or an abnormal state. For example, the algorithm for distinguishing a sound signal as a normal or abnormal state may be a generative model. In addition, the server storage unit 220 may store an algorithm for determining a road surface condition including wet, icy, slush, and snowy conditions in case of an abnormal state. For example, the algorithm for determining the road surface condition may be a discriminative model.

The server controller 230 controls the overall functional operation of the management server 200. The server controller 230 may include a primary determination module 231 and a secondary determination module 232.

The primary determination module 231 distinguishes a sound signal received from the road surface condition detection apparatus 100 as a normal state or an abnormal state. The primary determination module 231 may determine a normal or abnormal state through the generative model stored in the server storage unit 220 and learn the result.

The secondary determination module 232 determines a road surface condition including at least one of wet, icy, slush, and snowy conditions in case of the abnormal state. Here, the secondary determination module 232 may filter a background value and noise from the sound signal received from the road surface condition detection apparatus 100, and then determine the road surface condition based on a frequency range configured for each road surface condition. In this case, the secondary determination module 232 may determine the road surface condition through the discriminative model and learn the determination result.

In order to increase the accuracy of the determination result of the road surface condition, the secondary determination module 232 may determine the road surface condition in real time based on each moving object and finally determine the corresponding road surface condition when the road surface conditions for a predetermined number of moving objects match. That is, instead of transmitting the determination result for one moving object to the control system in real time, the secondary determination module 232 may accumulates the determination results for a predetermined number of moving objects and, when the accumulated determination results match, notify the corresponding road surface condition to the control system, thereby increasing accuracy.

In addition, the secondary determination module 232 may not only determine the road surface condition through the sound signal, but also calculate the dew point through the surface temperature and humidity received from the road surface condition detection apparatus 100 and apply the calculated dew point and the ambient temperature to determining the road surface condition. For example, the secondary determination module 232 may determine that the road surface is wet when the calculated dew point exceeds a predetermined value, and determine that the road surface is icy when the ambient temperature is lower than a predetermined value while the road surface is wet.

Also, the secondary determination module 232 may determine a pot hole, a crash, or a skid through the sound signal received from the road surface condition detection apparatus 100.

The secondary determination module 232 may output the determined road surface condition through an electronic road sign (VMS, variable message signs) or operate a snow removal device installed at a corresponding location relying on the determined road surface condition. For example, the secondary determination module 232 may operate in conjunction with a control system for managing and monitoring a road state or be installed in the control system, and may automatically expose an abnormal road condition and location on a screen. Thus, the control system may output a warning message through the electronic road sign, spray salt water or calcium chloride through a snow removal device installed on the road, or dispatches a tow vehicle in case of an accident.

In addition, the secondary determination module 232 may calculate a speed of a moving object based on a predetermined distance between the road surface condition detection apparatuses 100 and by measuring a passing time of the moving object from the sound signal measured by the road surface condition detection apparatus 100. That is, the secondary determination module 232 may determine a peak value of the sound signal measured by each road condition detection apparatus 100 as the passing time of the moving object and calculate the speed of the moving object by measuring the passing times of the road surface condition detection apparatuses 100. The measured speed may be used to crack down on the over-speed of a moving object in conjunction with a camera installed on the road. In this way, it is possible to reduce the cost of over-speed measuring equipment buried in the road.

Also, the secondary determination module 232 may determine the range of a road surface condition, based on whether road surface conditions determined from adjacent road surface condition detection apparatuses 100 overlap with each other. For example, when it is determined that the road surface conditions corresponding to a first road surface condition detection apparatus 100*a* and a second road surface condition detection apparatus 100*b* are icy, the secondary determination module 232 may determine a section between the first and second road surface condition detection apparatuses 100*a* and 100*b* as an icy section.

Hereinafter, a method for detecting a road surface condition according to an embodiment of the present invention will be described in detail.

Figure 4:
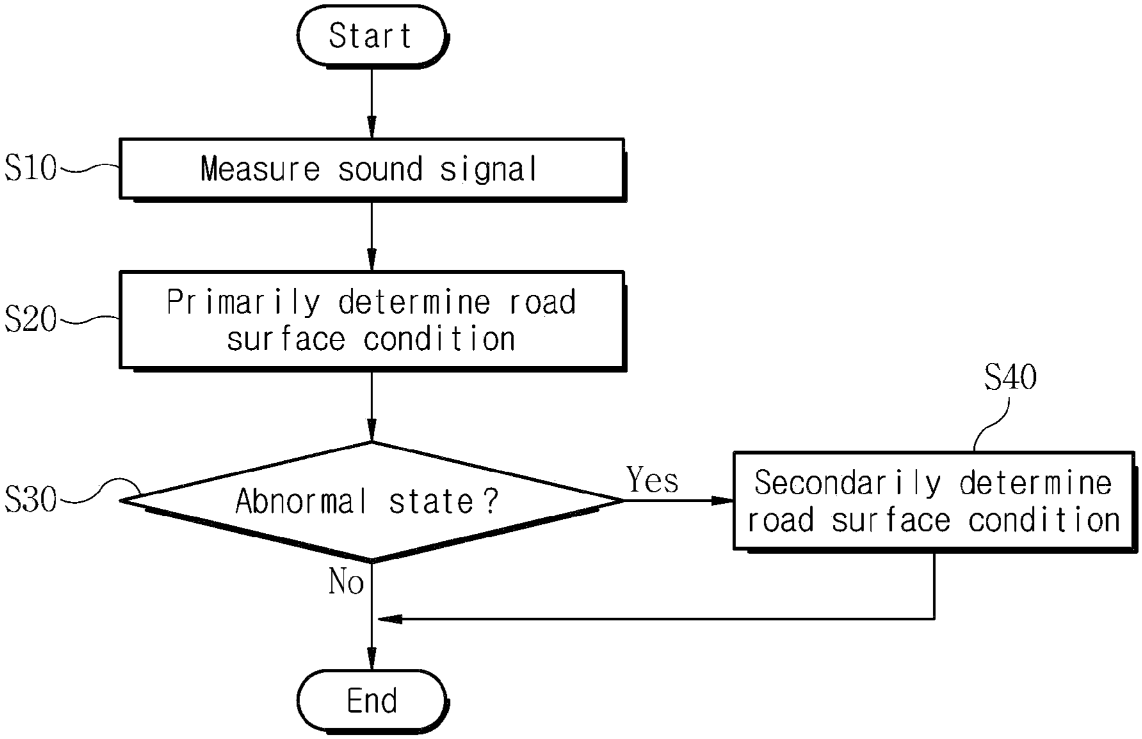
FIGS. 4 and 5 are flowcharts illustrating a method for detecting a road surface condition according to an embodiment of the present invention.
Figure 5:
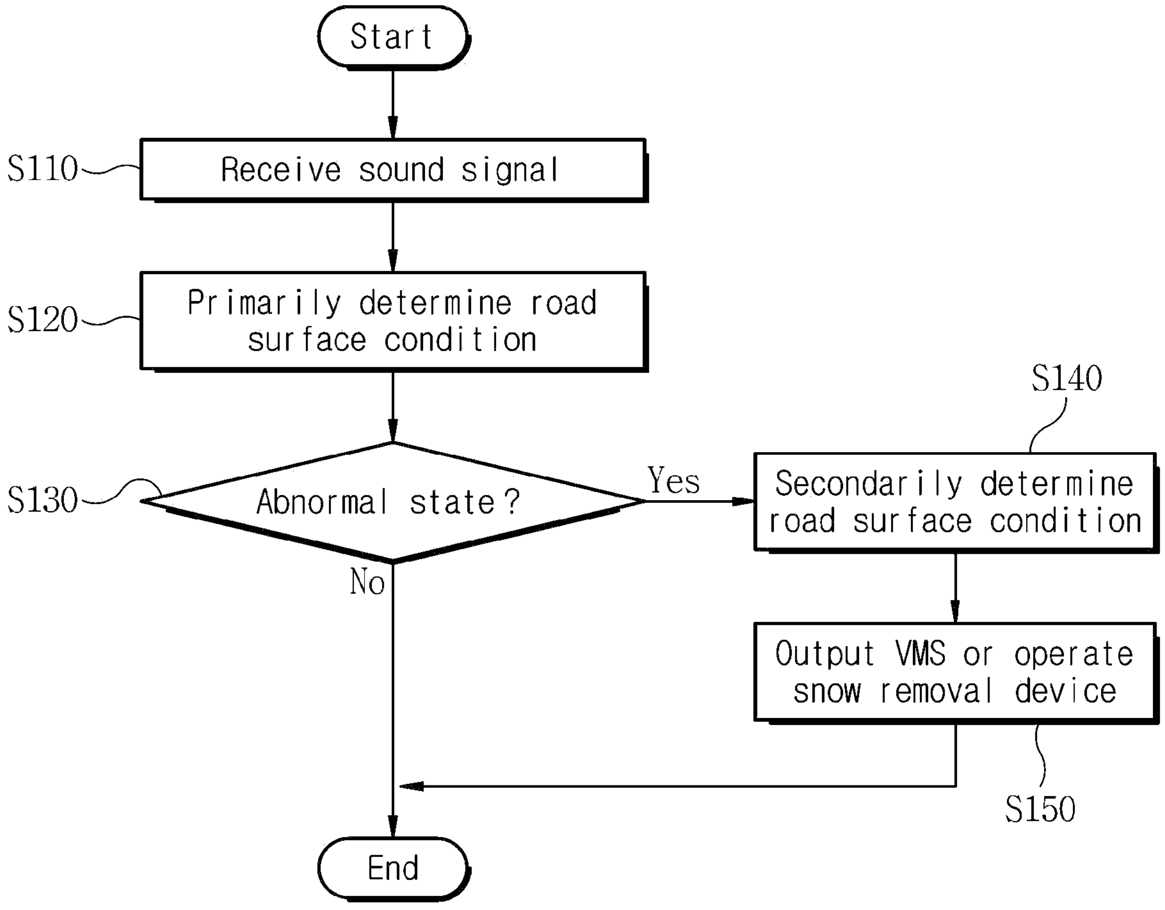

FIGS. 4 and 5 are flowcharts illustrating a method for detecting a road surface condition according to an embodiment of the present invention.

Referring to FIG. 4, at step S10, the road surface condition detection apparatus measures a sound signal.

Next, at step S20, the road surface condition detection apparatus primarily determines a road surface condition. That is, at the step S20, the road surface condition detection apparatus distinguishes the sound signal measured at the step S10 as a normal state or an abnormal state. In this case, the road surface condition detection apparatus may determine a normal or abnormal state through a generative model and learn the result.

Next, when the road surface condition is an abnormal state at step S30, the road surface condition detection apparatus may secondarily determine the road surface condition at step S40. At this time, the road surface condition detection apparatus determines the road surface condition including at least one of wet, icy, slush, and snowy conditions. Here, the road surface condition detection apparatus may filter a background value and noise from the sound signal and then determine the road surface condition based on a frequency range configured for each road surface condition. In this case, the road surface condition detection apparatus may determine the road surface condition through a discriminative model and learn the determination result. The road surface condition detection apparatus may transmit the determined road surface condition to the management server.

Referring to FIG. 5, at step S110, the management server receives a sound signal from the road surface condition detection apparatus.

Next, at step S120, the management server primarily determines a road surface condition. That is, at the step S120, the management server distinguishes the sound signal measured at the step S110 as a normal state or an abnormal state. In this case, the management server may determine a normal or abnormal state through a generative model and learn the result.

Next, when the road surface condition is an abnormal state at step S130, the management server may secondarily determine the road surface condition at step S140. At this time, the management server determines the road surface condition including at least one of wet, icy, slush, and snowy conditions. Here, the management server may filter a background value and noise from the sound signal and then determine the road surface condition based on a frequency range configured for each road surface condition. In this case, the management server may determine the road surface condition through a discriminative model and learn the determination result.

In addition, at step S150, the management server may output the determined road surface condition through an electronic road sign (VMS, variable message signs) or operate a snow removal device installed at a corresponding location relying on the determined road surface condition. For example, the management server may operate in conjunction with a control system for managing and monitoring a road state or be installed in the control system, and may automatically expose an abnormal road condition and location on a screen. Thus, the control system may output a warning message through the electronic road sign, spray salt water or calcium chloride through a snow removal device installed on the road, or dispatches a tow vehicle in case of an accident.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The invention claimed is:

1. An apparatus for detecting a road surface condition, comprising:

a sensor unit installed on a road and measuring a sound signal generated according to a movement of a moving object on the road; and a controller primarily determining the road surface condition by distinguishing the sound signal measured by the sensor unit as a normal state or an abnormal state and secondarily determining, in case of the abnormal state, the road surface condition including at least one of wet, icy, slush, and snowy conditions, wherein the primarily determining is performed based on a difference in frequency between the normal state and the abnormal state, and the secondarily determining is performed based on a frequency range configured for each road surface condition, wherein the sensor unit measures a road surface temperature, ambient temperature, and humidity, wherein the controller determines the road surface condition through the sound signal, calculates a dew point through the surface temperature and humidity measured by the sensor unit, and applies the calculated dew point and the ambient temperature to determining the road surface condition, and wherein the controller determines that the road surface is icy when the calculated dew point exceeds a predetermined value and when the ambient temperature is lower than a predetermined value.

2. The apparatus of claim 1, wherein the controller learns road surface conditions depending on sound signals measured by the sensor unit and determines the road surface condition through stored learning data.

3. The apparatus of claim 1, wherein the controller filters a background value and noise from the sound signal measured by the sensor unit and determines the road surface condition based on a frequency range configured for each road surface condition.

4. The apparatus of claim 3, wherein the controller determines the road surface condition in real time based on each moving object and finally determines the corresponding road surface condition when the road surface conditions for a predetermined number of moving objects match.

5. The apparatus of claim 1, wherein the controller determines a pot hole, a crash, or a skid through the sound signal measured by the sensor unit.

6. A system for detecting a road surface condition, comprising:

a road surface condition detection apparatus installed on a road and measuring a sound signal generated according to a movement of a moving object on the road; and a management server receiving the sound signal from the road surface condition detection apparatus, primarily determining the road surface condition by distinguishing the sound signal as a normal state or an abnormal state, and secondarily determining, in case of the abnormal state, the road surface condition including at least one of wet, icy, slush, and snowy conditions, wherein the primarily determining is performed based on a difference in frequency between the normal state and the abnormal state, and the secondarily determining is performed based on a frequency range configured for each road surface condition, wherein the road surface condition detection apparatus measures a road surface temperature, ambient temperature, and humidity, wherein the management server determines the road surface condition through the sound signal, calculates a dew point through the surface temperature and humidity measured by the road surface condition detection apparatus, and applies the calculated dew point and the ambient temperature to determining the road surface condition, and wherein the management server determines that the road surface is icy when the calculated dew point exceeds a predetermined value and when the ambient temperature is lower than a predetermined value.

7. The system of claim 6, wherein the road surface condition detection apparatus is provided as a plurality of road surface condition detection apparatuses installed to be spaced apart from each other at regular intervals on the road.

8. The system of claim 7, wherein the management server calculates a speed of the moving object based on a predetermined distance between the road surface condition detection apparatuses and by measuring a passing time of the moving object from the sound signal measured by the road surface condition detection apparatus.

9. The system of claim 7, wherein the management server determines a range of the road surface condition, based on whether road surface conditions determined from adjacent road surface condition detection apparatuses overlap with each other.

10. The system of claim 6, wherein the management server outputs the determined road surface condition through an electronic road sign (VMS, variable message signs) or operates a snow removal device installed at a corresponding location relying on the determined road surface condition.

11. A method for detecting a road surface condition, comprising:

by a road surface condition detection apparatus installed on a road, measuring a sound signal generated according to a movement of a moving object on the road;

by the road surface condition detection apparatus, primarily determining the road surface condition by distinguishing the measured sound signal as a normal state or an abnormal state; and by the road surface condition detection apparatus, secondarily determining, in case of the abnormal state, the road surface condition including at least one of wet, icy, slush, and snowy conditions, wherein the primarily determining is performed based on a difference in frequency between the normal state and the abnormal state, and the secondarily determining is performed based on a frequency range configured for each road surface condition, wherein the road surface condition detection apparatus measures a road surface temperature, ambient temperature, and humidity, wherein the road surface condition detection apparatus determines the road surface condition through the sound signal, calculates a dew point through the surface temperature and humidity measured by a sensor unit, and applies the calculated dew point and the ambient temperature to determining the road surface condition, and wherein the road surface condition detection apparatus determines that the road surface is icy when the calculated dew point exceeds a predetermined value and when the ambient temperature is lower than a predetermined value.

12. A method for detecting a road surface condition, comprising:

by a management server, receiving, from a road surface condition detection apparatus installed on a road, a sound signal generated according to a movement of a moving object on the road;

by the management server, primarily determining the road surface condition by distinguishing the sound signal as a normal state or an abnormal state; and by the management server, secondarily determining, in case of the abnormal state, the road surface condition including at least one of wet, icy, slush, and snowy conditions, wherein the primarily determining is performed based on a difference in frequency between the normal state and the abnormal state, and the secondarily determining is performed based on a frequency range configured for each road surface condition, wherein the road surface condition detection apparatus measures a road surface temperature, ambient temperature, and humidity, wherein the management server determines the road surface condition through the sound signal, calculates a dew point through the surface temperature and humidity measured by the road surface condition detection apparatus, and applies the calculated dew point and the ambient temperature to determining the road surface condition, and wherein the management server determines that the road surface is icy when the calculated dew point exceeds a predetermined value and when the ambient temperature is lower than a predetermined value.

13. The apparatus of claim 1, wherein the controller primarily determines the normal or abnormal state through a generative model and secondarily determines the road surface condition through a discriminative model.

14. The system of claim 6, wherein the management server primarily determines the normal or abnormal state through a generative model and secondarily determines the road surface condition through a discriminative model.

* * * * *